(12) United States Patent
Choi et al.

(10) Patent No.: US 11,216,634 B2
(45) Date of Patent: Jan. 4, 2022

(54) ULTRASONIC SENSOR AND DISPLAY DEVICE

(71) Applicant: LG Display Co., Ltd.

(72) Inventors: Yongkyun Choi, Gyeonggi-do (KR); KiDuk Kim, Gyeonggi-do (KR); JiHo Cho, Gyeonggi-do (KR); ManHyeop Han, Gyeonggi-do (KR); Junghoon Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/107,746

(22) Filed: Nov. 30, 2020

(65) Prior Publication Data
US 2021/0165988 A1 Jun. 3, 2021

(30) Foreign Application Priority Data
Dec. 2, 2019 (KR) .......................... 10-2019-0158193

(51) Int. Cl.
| | |
|---|---|
| G06K 9/00 | (2006.01) |
| G06K 9/20 | (2006.01) |
| B06B 1/02 | (2006.01) |
| B06B 1/06 | (2006.01) |
| G06F 3/043 | (2006.01) |

(52) U.S. Cl.
CPC .......... *G06K 9/0002* (2013.01); *B06B 1/0207* (2013.01); *B06B 1/0692* (2013.01); *G06K 9/209* (2013.01); *B06B 2201/56* (2013.01); *B06B 2201/70* (2013.01); *G06F 3/043* (2013.01); *G06K 9/0008* (2013.01)

(58) Field of Classification Search
CPC .... G06K 9/0002; G06K 9/209; G06K 9/0008; B06B 1/0207; B06B 1/0692; B06B 2201/56; B06B 2201/70; B06B 1/0215; B06B 1/0662; B06B 1/06; G06F 3/043; G06F 3/0414; G01S 15/89; G01H 11/08; H01L 41/042; H01L 41/047; H01L 41/09; H01L 41/187
See application file for complete search history.

(56) References Cited

U.S. PATENT DOCUMENTS

2018/0046836 A1* 2/2018 Hinger ................. G06K 9/0002
2020/0348818 A1* 11/2020 Ding ..................... H01L 27/323

* cited by examiner

*Primary Examiner* — Abhishek Sarma
(74) *Attorney, Agent, or Firm* — Morgan, Lewis & Bockius LLP

(57) ABSTRACT

An ultrasonic sensor and a display device and may drive a plurality of sensing pixels disposed in the ultrasonic sensor simultaneously to transmit an ultrasonic wave, may make a first electrode disposed in a sensing pixel to be floated at a timing receiving a reflected signal to store the signal, and then may perform a sensing sequentially. Therefore, as an accurate sensing may be possible while reducing a duration and a number of an ultrasonic wave transmitting, a sensitivity and an accuracy of a sensing may be maintained while improving a driving efficiency of the ultrasonic sensor.

19 Claims, 13 Drawing Sheets

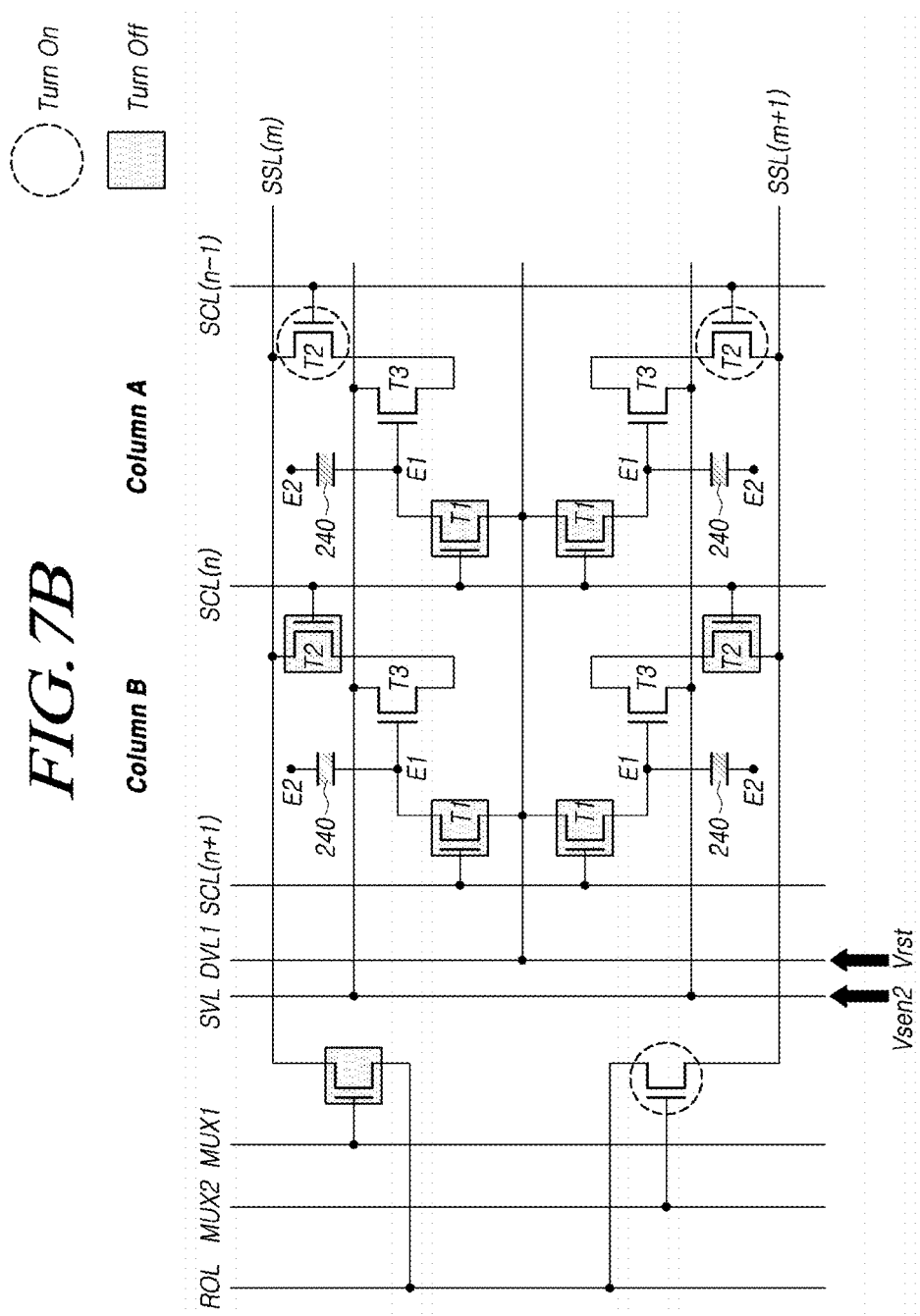

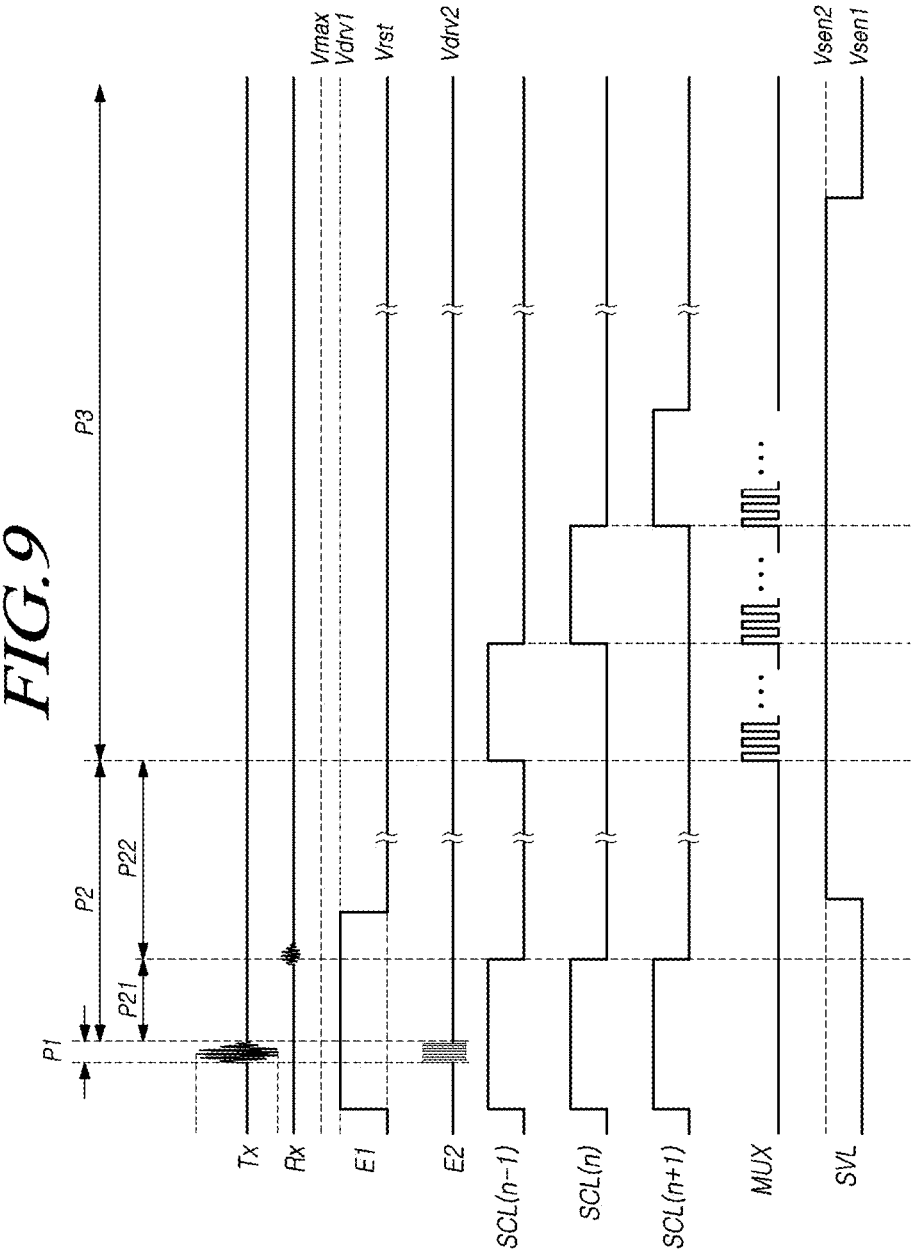

ULTRASONIC SENSOR AND DISPLAY DEVICE

CROSS REFERENCE TO RELATED APPLICATION

This application claims priority from Korean Patent Application No. 10-2019-0158193, filed on Dec. 2, 2019, which is hereby incorporated by reference for all purposes as if fully set forth herein.

BACKGROUND

Technical Field

Embodiments of the disclosure are related to ultrasonic sensors and display devices.

Discussion of Related Art

As an information society is developed, a demand to a display device displaying an image is increasing, and various types of display devices such as a liquid crystal display device and an organic light emitting display device are utilized.

The display device, for providing more various functions to a user, recognizes a touch of the user to a display panel, or recognizes a biometric data (e.g., a fingerprint or the like) or a gesture that is in contact with or close to the display panel, and provides a function performing an input process based on the recognized information.

For example, an optical sensor or the like may be used to recognize the biometric data or the like. But in a case that the optical sensor or the like is disposed in a bezel area of the display panel, there is a problem that an active area is reduced. Furthermore, in a case that the optical sensor is disposed in the active area, there is a problem to affect a display driving or reduce an accuracy of a sensing.

Thus, a method is necessary to improve a sensing performance of the biometric data or the like in the active area of the display panel without affecting the display driving of the display panel.

SUMMARY

Accordingly, embodiments of the present disclosure are directed to an ultrasonic sensor and a display device that substantially obviate one or more of the problems due to limitations and disadvantages of the related art.

An aspect of the present disclosure is to provide a function performing a sensing a biometric data or the like in an active area of a display panel, and a method improving a sensing performance of the biometric data or the like.

Another aspect of the present disclosure is to provide a method increasing a sensing efficiency and a sensing accuracy while minimizing a falling of the sensing performance due to a deterioration of a sensor for sensing the biometric data or the like.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, an ultrasonic sensor may comprise a pixel array which a plurality of scan lines, a plurality of sensing lines and a plurality of sensing pixels are disposed, a plurality of first electrode disposed in each of the plurality of sensing pixels, a piezoelectric material disposed on the first electrode, and a second electrode disposed on the piezoelectric material.

In this ultrasonic sensor, a first driving voltage may be simultaneously supplied to the plurality of first electrodes in a first period, and a second driving voltage may be supplied to the second electrode in the first period.

And in a state that a supply of the second driving voltage to the second electrode is stopped in a second period, a supply of the first driving voltage to the first electrode is stopped at a preset timing in the second period, and a sensing signal may be detected from the sensing pixel in a third period.

In another aspect, an ultrasonic sensor may comprise a pixel array which a plurality of scan lines, a plurality of sensing lines and a plurality of sensing pixels are disposed, a plurality of first electrodes disposed in each of the plurality of sensing pixels, a piezoelectric material disposed on the first electrode, and a second electrode disposed on the piezoelectric material, wherein a second driving voltage is supplied to the second electrode in a part of a period that a first driving voltage is simultaneously supplied to the plurality of first electrodes, and then a sensing signal is detected from the plurality of sensing pixels, and a period that the plurality of first electrodes are in a floating state is present between a period that the second driving voltage is supplied and a period that the sensing signal is detected.

According to various embodiments of the disclosure, a display device may comprise a display panel, and above-mentioned ultrasonic sensor embedded in the display panel or disposed on at least one surface of the display panel.

According to various embodiments of the disclosure, as performing a sensing of the biometric data or the like by using the ultrasonic sensor disposed on a rear of the display panel, a sensing function of the biometric data or the like in an active area may be provided while preventing a reduction of the active area of the display panel.

According to various embodiments of the disclosure, as performing a sensing sequentially after transmitting an ultrasonic wave simultaneously and storing a reflected signal in all sensing pixels, an accuracy of a sensing may be improved while increasing a driving efficiency of the ultrasonic sensor.

It is to be understood that both the foregoing general description and the following detailed description are exemplary and explanatory and are intended to provide further explanation of the inventive concepts as claimed.

DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings:

FIGS. 7A, 7B, 7C and 7D are views illustrating an example of a method driving the sensing pixel disposed in the ultrasonic sensor according to various embodiments of the disclosure in a readout period;

FIG. 9 is a view illustrating another example of a supplied signal and a timing that the signal is supplied when driving the ultrasonic sensor according to various embodiments of the disclosure.

DETAILED DESCRIPTION

Figure 1:
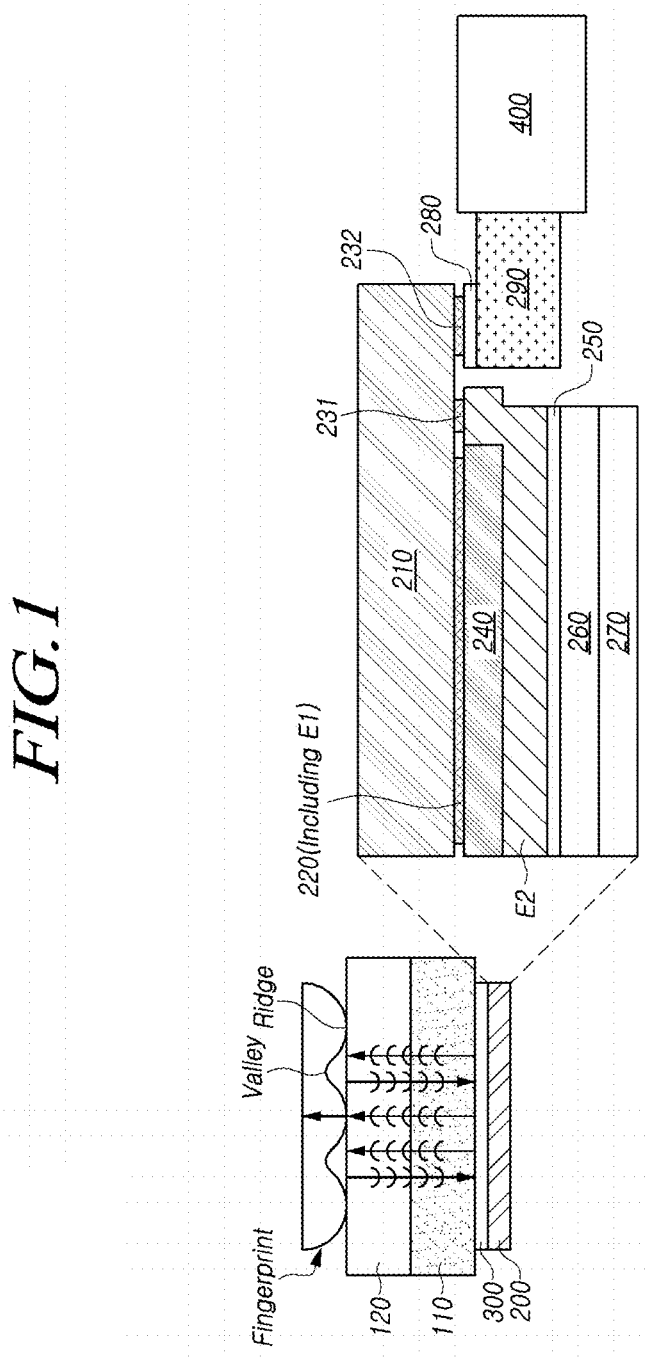
FIG. 1 is a view schematically illustrating a configuration of an ultrasonic sensor according to various embodiments of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a view schematically illustrating a configuration of an ultrasonic sensor 200 according to various embodiments of the disclosure, and FIG. 1 illustrates an example of a structure that the ultrasonic sensor 200 is disposed on a display device.

Referring to FIG. 1, the display device may comprise a display panel 110 in which a plurality of gate lines, a plurality of data lines and a plurality of subpixels are disposed, and various driving circuits to drive a signal line or a voltage line disposed on the display panel 110.

On at least one surface of this display device, the ultrasonic sensor 200 or an ultrasonic wave sensing device to sense a biometric data (e.g., a fingerprint) or a gesture that is in contact with or close to the display panel 110 may be disposed.

Alternatively, in some cases, this ultrasonic sensor 200 may be disposed inside the display device as an embedded type.

In a case that the ultrasonic sensor 200 is disposed on one surface of the display device, for example, a cover glass 120 may be disposed on a side that an image is displayed in the display panel 110. And the ultrasonic sensor 200 may be disposed on an opposite side of the side that the image is displayed in the display panel 110. That is, the ultrasonic sensor 200 may be disposed on an opposite side of a side that the cover glass 120 is disposed.

This ultrasonic sensor 200 may be bonded to the display panel 110 by an adhesive portion 300. And the adhesive portion 300, for example, may be made of a resin.

The ultrasonic sensor 200 may generate an ultrasonic wave, sense a reflected ultrasonic wave from a fingerprint contacted to the cover glass 120 disposed on the display panel 110, and recognize the fingerprint contacted to the cover glass 120. As the ultrasonic sensor 200 performs a sensing being disposed on an opposite side of a side that an image is displayed in the display panel 110, a fingerprint sensing may be possible without reducing an area that the image is displayed.

Specifically, when the ultrasonic wave generated from the ultrasonic sensor 200 is reached to a valley portion of the fingerprint, the ultrasonic wave may reach an air that is present between a skin of a people and the cover glass 120. Here, most of the ultrasonic wave reached to the air may be reflected due to a difference of an acoustic impedance value between the cover glass 120 and the air.

And when the ultrasonic wave generated from the ultrasonic sensor 200 is reached to a ridge portion of the fingerprint, the ultrasonic wave may reach the skin of the people contacted to the cover glass 120. Here, a part of the ultrasonic wave may be reflected, but most of the ultrasonic wave may be transmitted inside the skin and may be reflected inside the skin.

Thus, based on an intensity and a timing of the ultrasonic wave which reaches the valley portion and the ridge portion of the fingerprint and is reflected, the fingerprint may be sensed by separating the valley portion and the ridge portion of the fingerprint.

In this way, the ultrasonic sensor 200 may provide merits of not sensitive of a contamination or a condition of a skin surface and an excellent security, since the ultrasonic sensor 200 sense inside the skin. Furthermore, the display device may perform an input process using the fingerprint sensed, as sensing the fingerprint without reducing an area that the image is displayed.

This ultrasonic sensor 200 may comprise a material for generating the ultrasonic wave, and various circuit elements for generating and sensing the ultrasonic wave.

For example, the ultrasonic sensor 200 may comprise a substrate 210, a thin film transistor array 220 disposed on the substrate 210, a first pad portion 231, a second pad portion 232. And the thin film transistor array 220 may comprise a first electrode E1 disposed in each pixel, and a piezoelectric material 240 and a second electrode E2 may be disposed on the thin film transistor array 220 sequentially.

Here, the first electrode E1 may be regarded as a pixel electrode, and the second electrode E1 may be regarded as a common electrode. And one of the first electrode E1 and the second electrode E2 may be a transmitting electrode, and the other may be a receiving electrode.

The piezoelectric material 240, for example, may be a material of PZT, ZnO, perovskite or the like, but not limited to these.

The second electrode E2 may be bonded to a reflection layer 260 by an adhesive layer 250, and a cover layer 270 may be disposed on the reflection layer 260.

A controller 400 supplying a signal, a voltage or the like to the thin film transistor array 220 and the second electrode E2 or the like may be electrically connected to the second pad portion 232 disposed on the substrate 210 through a flexible printed circuit 290 and a bonding portion 280.

In the thin film transistor array 220, a transistor for driving of generating the ultrasonic wave and sensing of the ultrasonic wave reflected from the fingerprint, and the first electrode E1 may be disposed.

The first electrode E1 disposed in the thin film transistor array 220 may be formed as a capacitor with the second electrode E2.

And by a voltage applied to the first electrode E1 and the second electrode E2 disposed in the thin film transistor array 220, the piezoelectric material 240 may be vibrated and the ultrasonic wave may be generated.

The thin film transistor array 220 comprising this first electrode E1, the piezoelectric material 240 and the second electrode E2 may be regarded as a pixel array in an aspect of a circuit.

The second electrode E2, for example, may be disposed as a method that a silver ink is coated, in some cases, may be disposed as a shape covering whole of the piezoelectric material 240, or as a certain pattern.

The reflection layer 260, for example, may be made of a copper, and may perform a function reflecting the ultrasonic wave that is reflected and returned from the fingerprint to the thin film transistor array 220.

The cover layer 270, for example, may be made of a polyimide, may provide a function capping the pixel array and the reflection layer 260 or the like of the ultrasonic sensor 200.

In some cases, the reflection layer 260 and the cover layer 270, may be disposed as one film shape, or may be implemented as a shape that an organic material or a dielectric material or the like is coated on the second electrode E2.

The signal and the voltage for driving the pixel array may be supplied from the controller 400. Alternatively, in some cases, a signal or the like that a high voltage is not required may be supplied from the driving circuit disposed for driving of the display panel 110.

Figure 2:
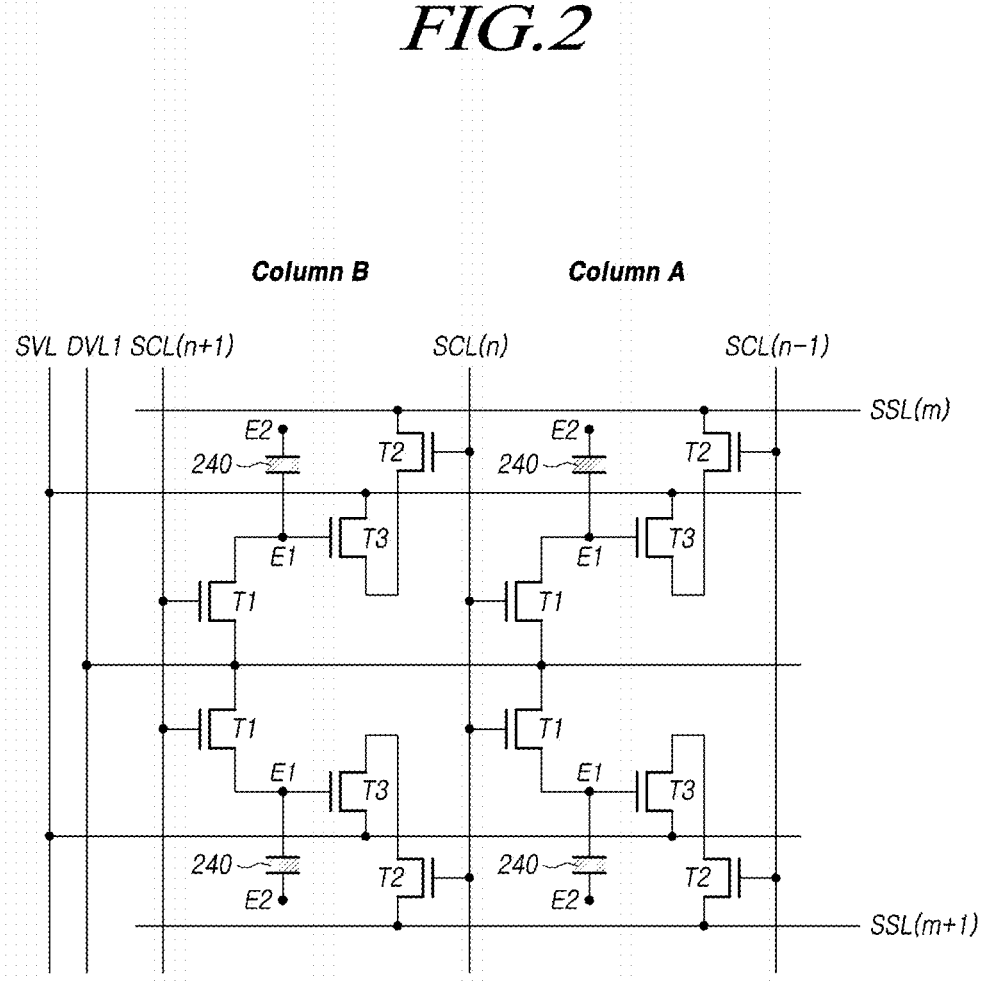
FIG. 2 is a view illustrating an example of a circuit structure of a pixel array of the ultrasonic sensor according to various embodiments of the disclosure.

FIG. 2 is a view illustrating an example of a circuit structure of the pixel array of the ultrasonic sensor 200 according to various embodiments of the disclosure.

Referring to FIG. 2, in the pixel array of the ultrasonic sensor 200, a plurality of scan lines SCL and a plurality of sensing lines SSL may be disposed. For example, the scan line SCL and the sensing line SSL may be disposed crossing each other. And a plurality of sensing pixels may be disposed in an area defined by the crossing of the scan line SCL and the sensing line SSL.

Furthermore, in the pixel array, a voltage line may be disposed for supplying a driving voltage Vdrv, a sensing voltage Vsen or the like for generating and sensing of the ultrasonic wave of the sensing pixel.

For example, a first driving voltage line DVL1 supplying a first driving voltage Vdrv1 to the first electrode E1 and a sensing voltage line SVL supplying the sensing voltage Vsen may be disposed. The first driving voltage line DVL1 and the sensing voltage line SVL may be outside of an area where the sensing pixel is disposed.

Since the second electrode E2 may be disposed overall on the piezoelectric material 240, a second driving voltage line DVL2 supplying a second driving voltage Vdrv2 to the second electrode E2 may be disposed in the thin film transistor array 220, or not. That is, the second electrode E2 may be directly connected to the first pad portion 231 or the like, and may be supplied the second driving voltage Vdrv2 through the first pad portion 231.

The ultrasonic sensor 200 may comprise a circuit to drive the plurality of scan lines SCL disposed in the pixel array, and a circuit or the like to detect a sensing signal through the plurality of sensing lines SSL.

In each sensing pixel, various circuit elements may be disposed for generating and sensing the ultrasonic wave.

For example, in each sensing pixel, a first thin film transistor T1 and a second thin film transistor T2 controlled by a scan signal applied to the scan line SCL may be disposed. And a third thin film transistor T3 controlled by a voltage level of the first electrode E1 may be disposed in the sensing pixel. Furthermore, a capacitor formed by the first electrode E1 and the second electrode E2 may be disposed in the sensing pixel.

That is, FIG. 2 illustrates a case that a circuit structure of the sensing pixel is 3T1C as an example, the circuit structure of the sensing pixel disposed in the ultrasonic sensor 200 is not limited to this.

Furthermore, FIG. 2 illustrates a case that all of the first thin film transistor T1, the second thin film transistor T2 and the third thin film transistor T3 are N types as an example, in some cases, all of those may be implemented as P types. Alternatively, the first thin film transistor T1 and the second thin film transistor T2 may be implemented as same types, and the third thin film transistor T3 may be implemented as a different type.

The first thin film transistor T1 may be controlled by the scan signal applied to the scan line SCL. And the first thin film transistor T1 may be electrically connected between the first driving voltage line DVL1 supplying the first driving voltage Vdrv1 and the first electrode E1.

The second thin film transistor T2 may be controlled by the scan signal applied to the scan line SCL. And the second thin film transistor T2 may be electrically connected between the sensing line SSL and the third thin film transistor T3.

Here, the second thin film transistor T2 may be driven by a same scan line SCL with the scan line SCL driving the first thin film transistor T1 disposed in an adjacent sensing pixel.

That is, like as an example illustrated in FIG. 2, all of the second thin film transistor T2 disposed in the subpixel of a column B and the first thin film transistor T1 disposed in the subpixel of a column A may be electrically connected to nth scan line SCL(n). Thus, the first thin film transistor T1 of the column A and the second thin film transistor T2 of the column B may be driven simultaneously, the number of the scan line SCL disposed in the pixel array may be reduced.

The third thin film transistor T3 may be controlled by the voltage level of the first electrode E1. And the third thin film transistor T3 may be electrically connected between the sensing voltage line SVL and the second thin film transistor T2.

In each sensing pixel, the capacitor formed by the first electrode E1 and the second electrode E2 may be disposed. The first electrode E1 may be disposed separately in each sensing pixel, and the second electrode E2 may be disposed commonly in two or more sensing pixels.

The piezoelectric material 240 may be disposed between the first electrode E1 and the second electrode E2.

Thus, the piezoelectric material 240 may be vibrated according to the first driving voltage Vdrv1 supplying to the first electrode E1 and the second driving voltage Vdrv2 supplying to the second electrode E2, and the ultrasonic wave may be generated.

Here, one of the first driving voltage Vdrv1 and the second driving voltage Vdrv2 may be a constant voltage, and the other, for example, may be an alternating current voltage swinging from +100V to −100V. That is, as supplying the alternating current voltage to the other electrode in a state that the constant voltage is supplied to one of the first electrode E1 and the second electrode E2, the ultrasonic wave by a vibration of the piezoelectric material 240 may be generated.

And according to changes of the voltage level of the first electrode E1 when receiving the ultrasonic wave, a turn-on state or an output current of the third thin film transistor T3 may be changed. At this, as detecting the sensing signal by turning-on the second thin film transistor T2, the reflected ultrasonic wave may be sensed and a sensing of the biometric data based on a sensing of the ultrasonic wave may be performed.

Figure 3:
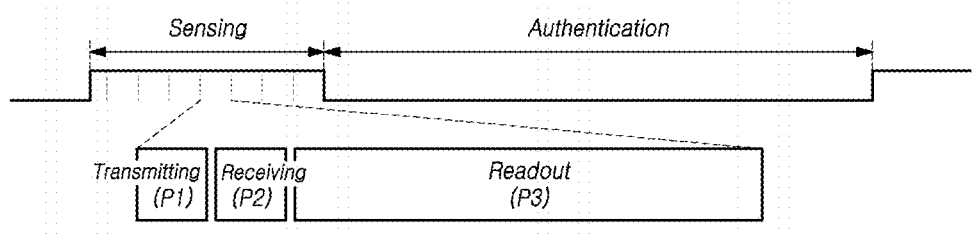
FIG. 3 is a view illustrating an example of a driving method of the ultrasonic sensor according to various embodiments of the disclosure.

FIG. 3 is a view illustrating an example of a driving method of the ultrasonic sensor 200 according to various embodiments of the disclosure.

Referring to FIG. 3, the ultrasonic sensor 200, for example, may be driven by being divided into a sensing period performing a sensing of the ultrasonic wave, and an authentication period performing an information process based on a sensing data acquired in the sensing period.

The ultrasonic sensor 200 may generate the ultrasonic wave as vibrating the piezoelectric material 240 by driving the first electrode E1 and the second electrode E2 disposed in the sensing pixel in a first period P1 of the sensing period. Here, the first period P1 may be regarded as an ultrasonic wave transmitting period. And the ultrasonic sensor 200 may transmit the ultrasonic wave by driving all sensing pixel disposed in the pixel array in the ultrasonic wave transmitting period.

The ultrasonic sensor 200 may receive the reflected ultrasonic wave in a second period P2 after the first period P1, and the second period P2 may be regarded as an ultrasonic wave receiving period. Here, a part of the ultrasonic wave receiving period may be a period to store a received signal.

And the ultrasonic sensor 200 may detect the sensing signal according to the received ultrasonic wave in a third period P3 after the second period P2, and the third period P3 may be regarded as a readout period.

That is, according to various embodiments of the disclosure, as the plurality of sensing pixels disposed in the pixel array transmits the ultrasonic wave simultaneously, a duration for transmitting the ultrasonic wave may be reduced. Thus, as reducing a period that an alternating current voltage of high level is supplied for transmitting the ultrasonic wave, the deterioration of the thin film transistor array 220 due to applying a high voltage may be reduced.

Furthermore, as detecting the sensing signal sequentially after storing the received signal in each sensing pixel in the ultrasonic wave receiving period, an accuracy of the sensing may be maintained while reducing the ultrasonic wave transmitting period.

Figure 4:
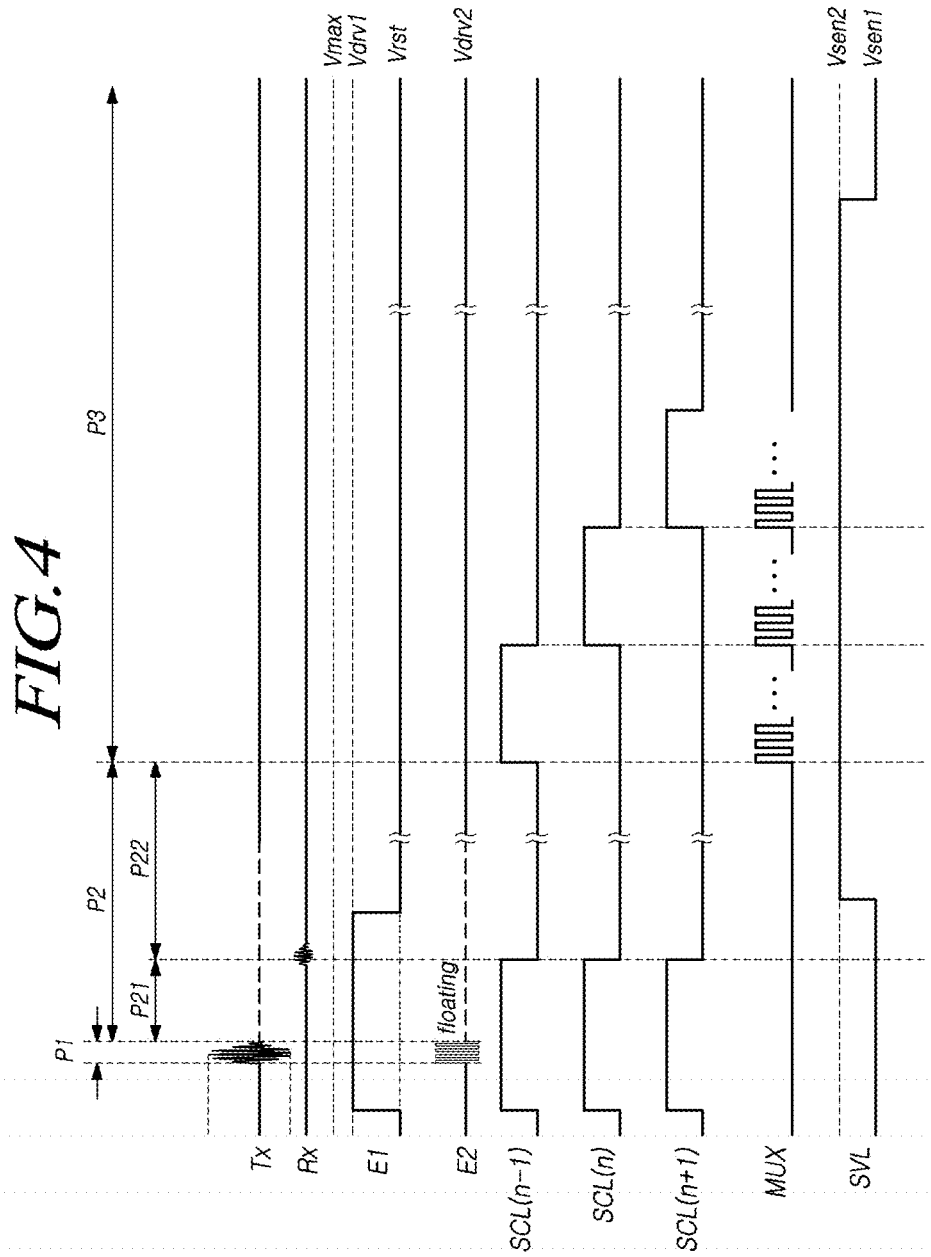
FIG. 4 is a view illustrating an example of a supplied signal and a timing that the signal is supplied when driving the ultrasonic sensor according to various embodiments of the disclosure.

FIG. 4 is a view illustrating an example of a supplied signal and a timing that the signal is supplied when driving the ultrasonic sensor 200 according to various embodiments of the disclosure. And FIGS. 5 to 7D are views illustrating examples of a method driving the sensing pixel in a driving process of the ultrasonic sensor 200.

Figure 5:
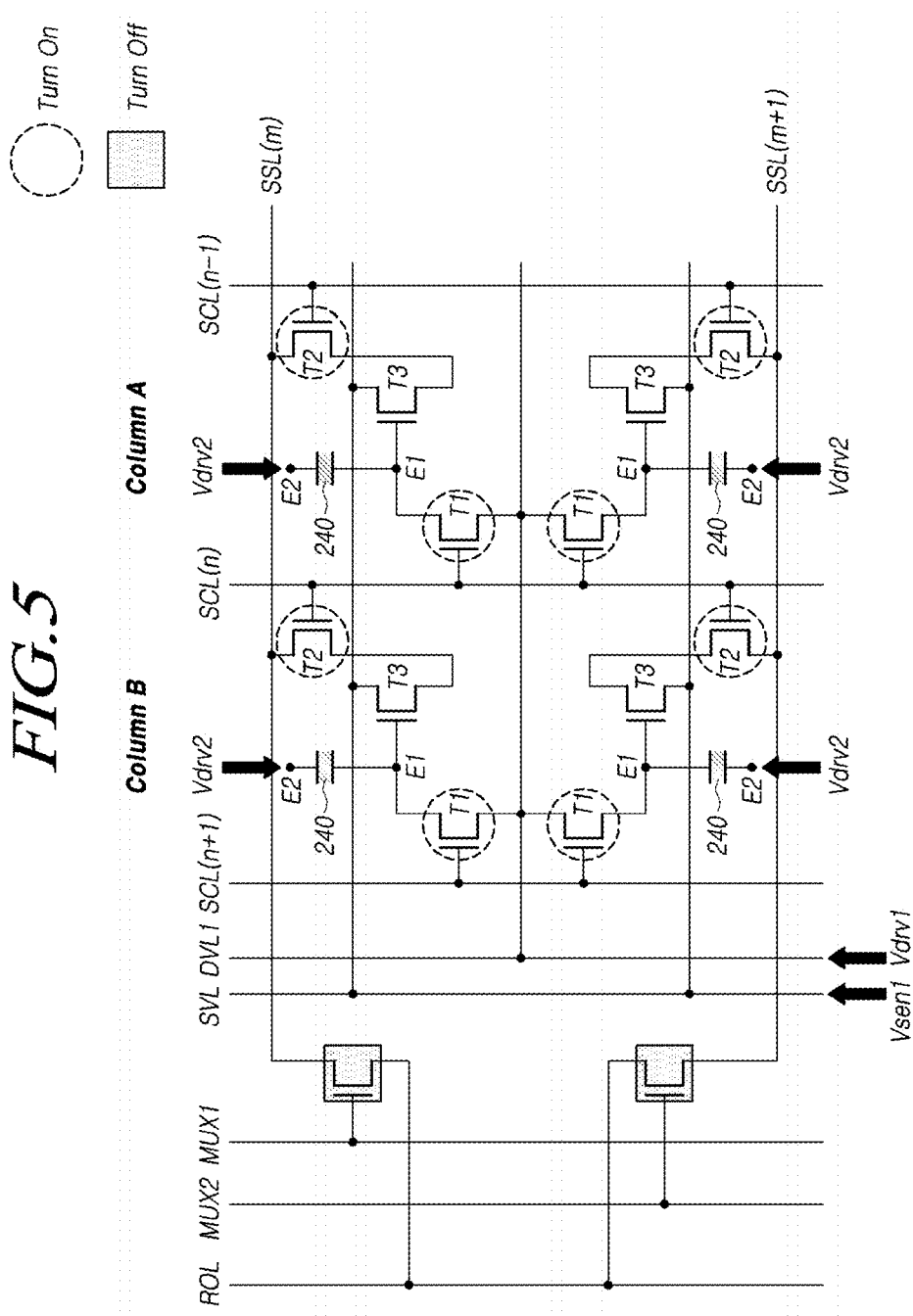
FIG. 5 is a view illustrating an example of a method driving a sensing pixel disposed in the ultrasonic sensor according to various embodiments of the disclosure in an ultrasonic wave transmitting period.
Figure 6A:
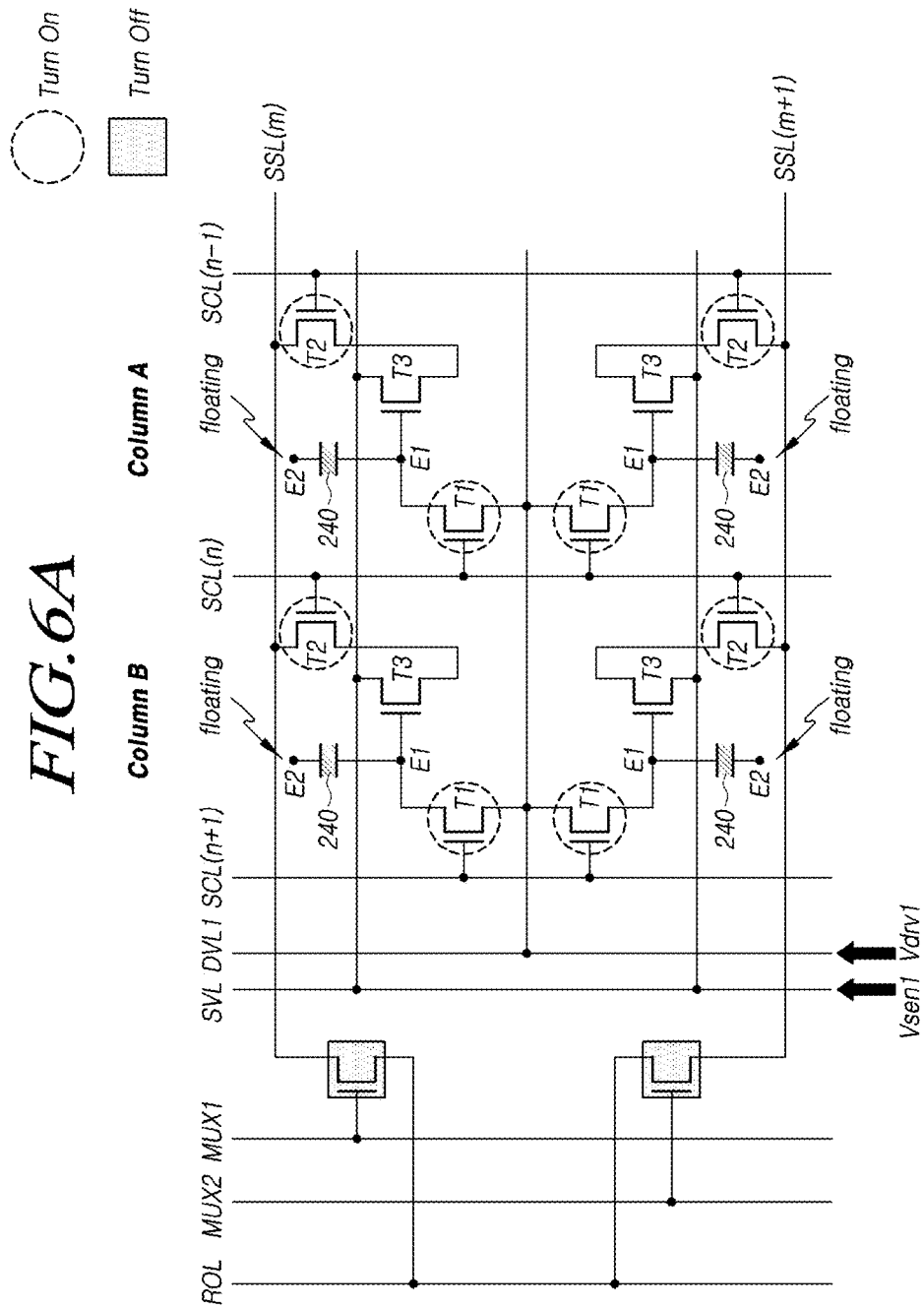
FIGS. 6A and 6B are views illustrating an example of a method driving the sensing pixel disposed in the ultrasonic sensor according to various embodiments of the disclosure in an ultrasonic wave receiving period.
Figure 6B:
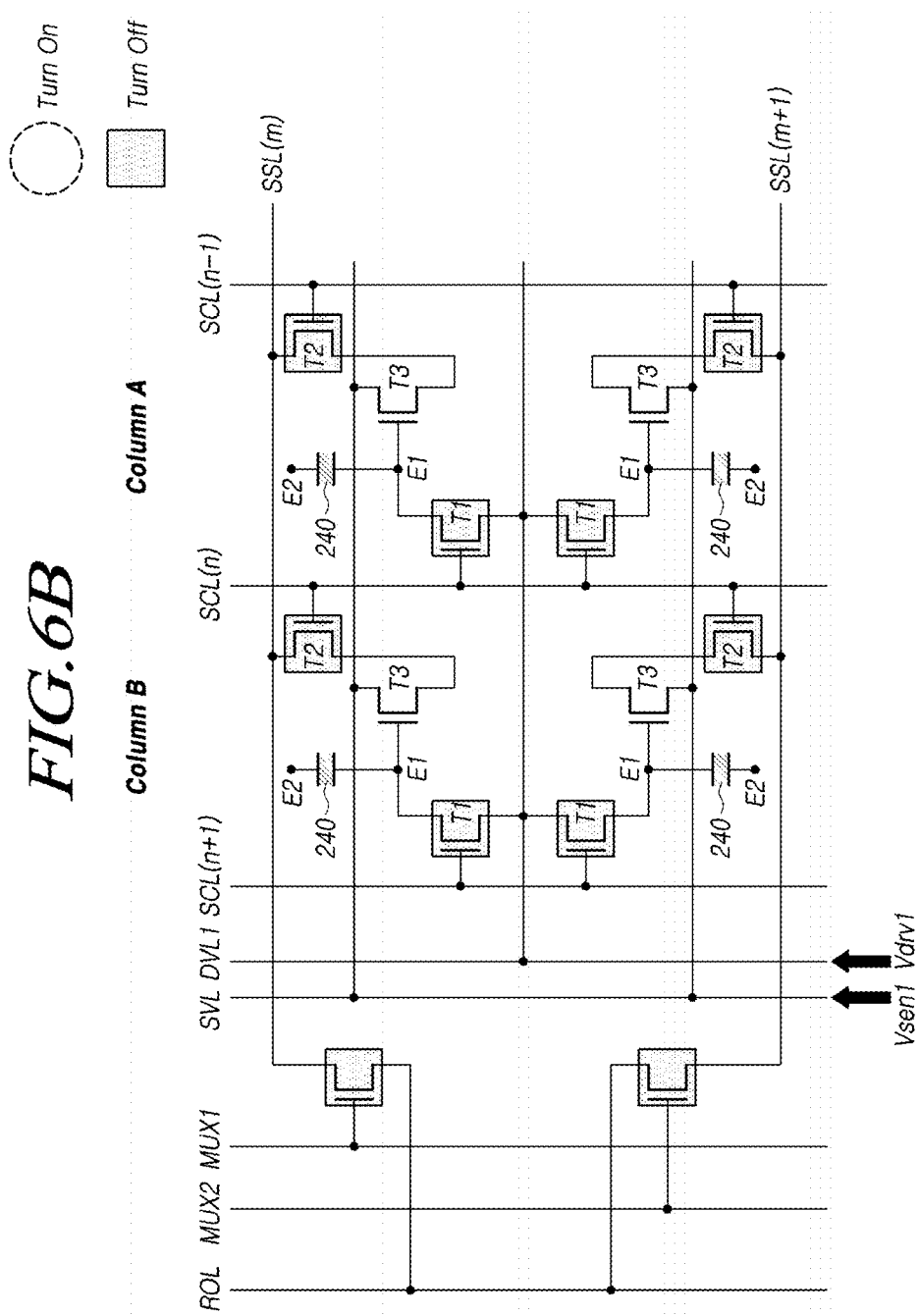

Specifically, FIG. 5 is a view illustrating an example of a method driving the sensing pixel disposed in the ultrasonic sensor 200 according to various embodiments of the disclosure in the ultrasonic wave transmitting period. And FIGS. 6A and 6B are views illustrating an example of a method driving the sensing pixel disposed in the ultrasonic sensor 200 according to various embodiments of the disclosure in the ultrasonic wave receiving period. FIGS. 7A to 7D are views illustrating an example of a method driving the sensing pixel disposed in the ultrasonic sensor 200 according to various embodiments of the disclosure in the readout period.

Referring to FIG. 4, the ultrasonic sensor 200 may be driven by being divided into the first period P1 to transmit the ultrasonic wave, the second period P2 to receive and store the reflected signal and the third period P3 to readout the stored signal.

In the first period P1, the driving voltage Vdrv may be supplied to the first electrode E1 and the second electrode E2 of the pixel array of the ultrasonic sensor 200. And according the driving voltage Vdrv, the piezoelectric material 240 disposed between the first electrode E1 and the second electrode E2 may be vibrated and the ultrasonic wave may be generated.

Referring to FIGS. 4 and 5, in the first period P1, a scan signal of a level to turn on a thin film transistor connected to the scan line SCL may be supplied to the plurality of scan lines SCL. Thus, all of the first thin film transistor T1 and the second thin film transistor T2 connected to the scan line SCL may be turned on.

And as the first thin film transistor T1 is turned on, the first driving voltage Vdrv1 supplying through the first driving voltage line DVL1 may be supplied to the first electrode E1 disposed in each sensing pixel.

Furthermore, the second driving voltage Vdrv2 may be supplied to the second electrode E2 in a part of a period that the scan signal of a turn on level is supplied to the scan line SCL.

Here, the first driving voltage Vdrv1 may be the constant voltage. And the second driving voltage Vdrv2 may be the alternating current voltage. For example, the second driving voltage Vdrv2 may be the alternating current voltage swinging by ±α based on the first driving voltage Vdrv1. If the first driving voltage Vdrv1 is 10V, the second driving voltage Vdrv2 may be the alternating current voltage swinging from +110V to −90V.

In this way, as the first driving voltage Vdrv1 and the second driving voltage Vdrv2 are supplied to all sensing pixels disposed in the pixel array simultaneously, the ultrasonic wave may be transmitted in all sensing pixels simultaneously. Thus, reducing a duration and a number of the ultrasonic wave transmitting, a period that the high voltage is supplied to the pixel array may be reduced.

Furthermore, as the high voltage is supplied to the second electrode, the deterioration of the thin film transistor or the like disposed in the pixel array due to applying the high voltage may be prevented.

The first driving voltage Vdrv1 supplied to the first electrode E1 in the first period P1 may be a voltage of a level to turn on the third thin film transistor T3 controlled by the voltage level of the first electrode E1. And the first driving voltage Vdrv1 may be a lower voltage than a voltage being possible to supply through the first driving voltage line DVL1 or a maximum voltage Vmax to maximize an output current of the third thin film transistor T3.

As the voltage level of the first electrode E1 is changed according to the reflected signal at a level to turn on the third thin film transistor T3, a sensing sensitivity may be improved.

Furthermore, the first driving voltage Vdrv1 may have the voltage level positioned in a saturation region in a graph representing a relation between the sensing voltage Vsen supplied to the third thin film transistor T3 and the output current.

Figure 8:
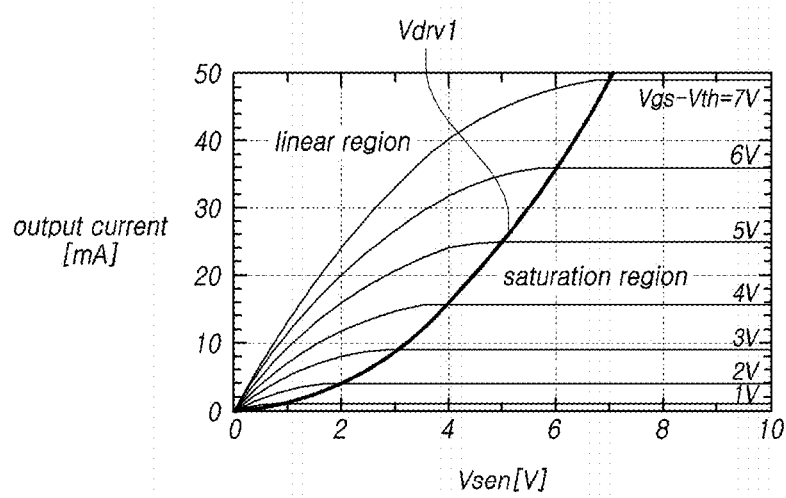
FIG. 8 is a view illustrating an example of a relation between a sensing voltage and a sensing signal according a voltage supplied to a receiving electrode in the ultrasonic sensor according to various embodiments of the disclosure.

FIG. 8 is a view illustrating an example of a relation between the sensing voltage Vsen and the sensing signal according a voltage supplied to the receiving electrode in the ultrasonic sensor according to various embodiments of the disclosure.

Referring to FIG. 8, the voltage level of the first driving voltage Vdrv1 may be positioned in the saturation region in a relation graph between the sensing voltage Vsen supplied to the third thin film transistor T3 and the output current of the third thin film transistor T3.

For example, in a case that the sensing voltage Vsen is 6V, the first driving voltage Vdrv1 may be configured as 5V positioned in the saturation region. If the voltage level of the first electrode E1 is increased 1V by the reflected signal to become 6V in a state that a voltage of 5V is applied to the first electrode E1, the output current of the third thin film transistor T3 may be increased 10 mA from about 25 mA to about 35 mA.

Thus, as a level of increase of the output current may be greater than a case that the level of the first driving voltage Vdrv1 is positioned in a linear region, an intensity of the sensing signal detected through the sensing line SSL may be increased. And increasing the intensity of the sensing signal, the sensing sensitivity may be improved.

Alternatively, according to an object of the sensing or a type of the sensing method, the level of the first driving voltage Vdrv1 may be configured to be positioned in the linear area, and the sensing of the ultrasonic wave may be performed.

A first sensing voltage Vsen1 may be supplied to a sensing voltage line SVL connected to the third thin film transistor T3 in the first period P1 to transmit the ultrasonic wave. And the first sensing voltage Vsen, for example, may be 0V. furthermore, a multiplexer MUX connected to the sensing line SSL may be in a turn off state.

Accordingly, even if the first driving voltage Vdrv1 of a level to turn on the third thin film transistor T3 is supplied in a state that the second thin film transistor T2 is turned on, the sensing may not be affected. And the sensing line SSL may be initialized by the first sensing voltage Vsen1.

After the ultrasonic wave is transmitted, the second electrode E2 being supplied the second driving voltage Vdrv2 may become in a floating state. Furthermore, the first electrode E1 may become in the floating state at a preset timing. That is, a period that the first electrode E1 is in the floating state may be present between the ultrasonic wave transmitting period and the readout period.

Referring to FIGS. 4 and 6A, in a state maintaining the scan signal of the turn on level in the second period P2, a supply of the second driving voltage Vdrv2 to the second electrode E2 may be stopped. Thus, the second electrode E2 may be in the floating state. And as a state that a transmission of the ultrasonic wave has been performed, the sensing pixel may be a state being capable of receiving the reflected signal.

Here, a supply of the first driving voltage Vdrv1 to the first electrode E1 may be stopped according to a timing that the reflected ultrasonic wave is received or the intensity received is the most strongest.

For example, the first electrode E1 may become in the floating state according to a peak timing of the received signal. Thus, by storing the signal received at a timing that the intensity of the signal is the strongest, the sensing sensitivity may be increased.

Referring to FIGS. 4 and 6B, for example, the scan signal of the level to turn off the thin film transistor connected to the scan line SCL may be supplied to the plurality of scan lines SCL at end timing of a delay period P21 waiting the ultrasonic wave receiving in the second period P2.

Thus, all of the first thin film transistor T1 and the second thin film transistor T2 connected to the scan line SCL may become in the turn off state.

As the first thin film transistor T1 become in the turn off state, even if a state that the first driving voltage Vdrv1 is supplied to the first driving voltage line DVL1 is maintained, a supply of the first driving voltage Vdrv1 to the first electrode E1 may be stopped. And the first electrode E1 may become in the floating state.

As the first electrode E1 become in the floating state in a state that the second electrode E2 is in the floating state, the received signal may be stored in the first electrode E1. And a state that the first electrode E1 stores the reflected signal may be maintained during a store period P22 after supplying the scan signal of the turn off level to the scan line SCL in the second period P2.

In this way, as the ultrasonic wave is transmitted in all sensing pixels simultaneously, the duration of the ultrasonic wave transmitting period may be reduced. And as storing the received signal by floating the first electrode E1 according to a timing that the reflected ultrasonic wave is received, an accurate sensing may be performed while reducing the ultrasonic wave transmitting period.

After storing the received signal, the stored signal may be detected from each sensing pixel sequentially.

Figure 7A:
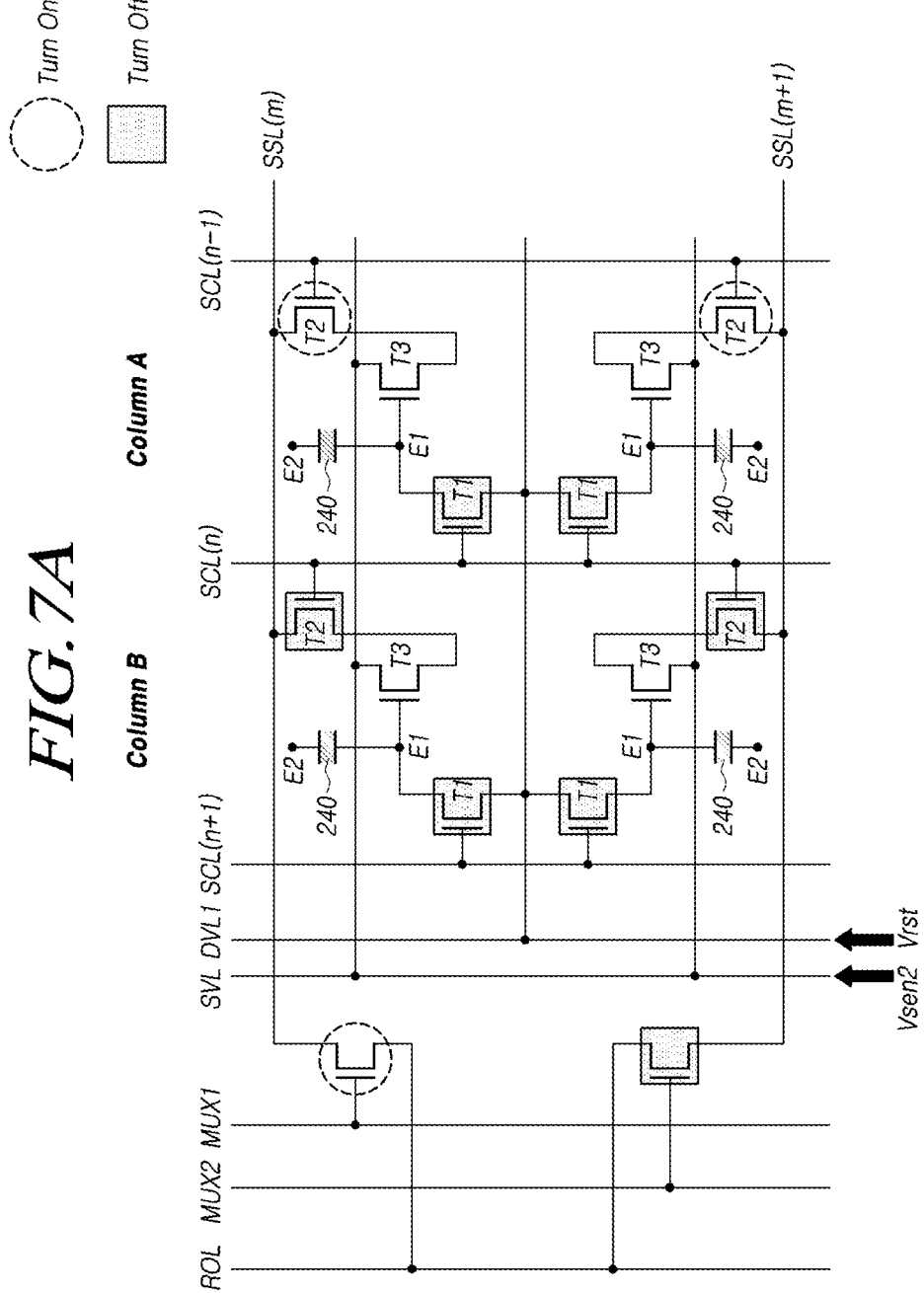

Referring to FIGS. 4, 7A and 7B, the scan signal of the level to turn on the thin film transistor connected to the scan line SCL may be supplied to (n−1)th scan line SCL(n−1) in the third period P3. And a state that the scan signal of the level to turn off the thin film transistor is supplied to remaining scan lines SCL may be maintained.

Furthermore, a second sensing voltage Vsen2 may be supplied to the sensing voltage line SVL. The second sensing voltage Vsen2 may be a higher voltage than the first sensing voltage Vsen1 being supplied in the first period P1 and at least a part of the second period P2.

As the scan signal of the turn on level is supplied to (n−1)th scan line SCL(n−1), the second thin film transistor T2 connected to (n−1)th scan line SCL(n−1) may become in the turn on state all.

Since the second thin film transistor T2 become in the turn on state and the second sensing voltage Vsen2 of a certain level is supplied, the output current of the third thin film transistor T3 may be occurred, or a change of the output current may be occurred according to the voltage level of the first electrode E1.

And a signal of the level to turn on the multiplexer MUX connected to the sensing line SSL may be supplied sequentially.

For example, referring to FIG. 7A, the signal of the level to turn on a first multiplexer MUX1 may be supplied. Thus, the stored signal in sensing pixels of the column A connected to mth sensing line SSL(m) may be detected through a readout line ROL.

After, referring to FIG. 7B, the signal of the level to turn on a second multiplexer MUX2 may be supplied. Thus, the stored signal in sensing pixels of the column A connected to (m+1)th sensing line SSL(m+1) may be detected through the readout line ROL.

Accordingly, the stored signal in the first electrode E1 disposed in each sensing pixel of the column A may be detected sequentially.

And FIGS. 7A and 7B represent an example of four sensing pixels, and for a convenience of an explanation, a structure that two multiplexers MUX and one readout line ROL are disposed is described as an example, a disposition structure of the multiplexer MUX and the readout line ROL is not limited to this.

Here, the constant voltage may be supplied to the second electrode E2 in the third period P3, for example, a ground voltage may be supplied.

And a reset voltage Vrst different from the first driving voltage Vdrv1 may be supplied to the first driving voltage line DVL1, and the reset voltage Vrst, for example, may be 0V. Thus, after finishing the sensing, the first electrode E1 may be reset by the reset voltage Vrst.

Figure 7C:
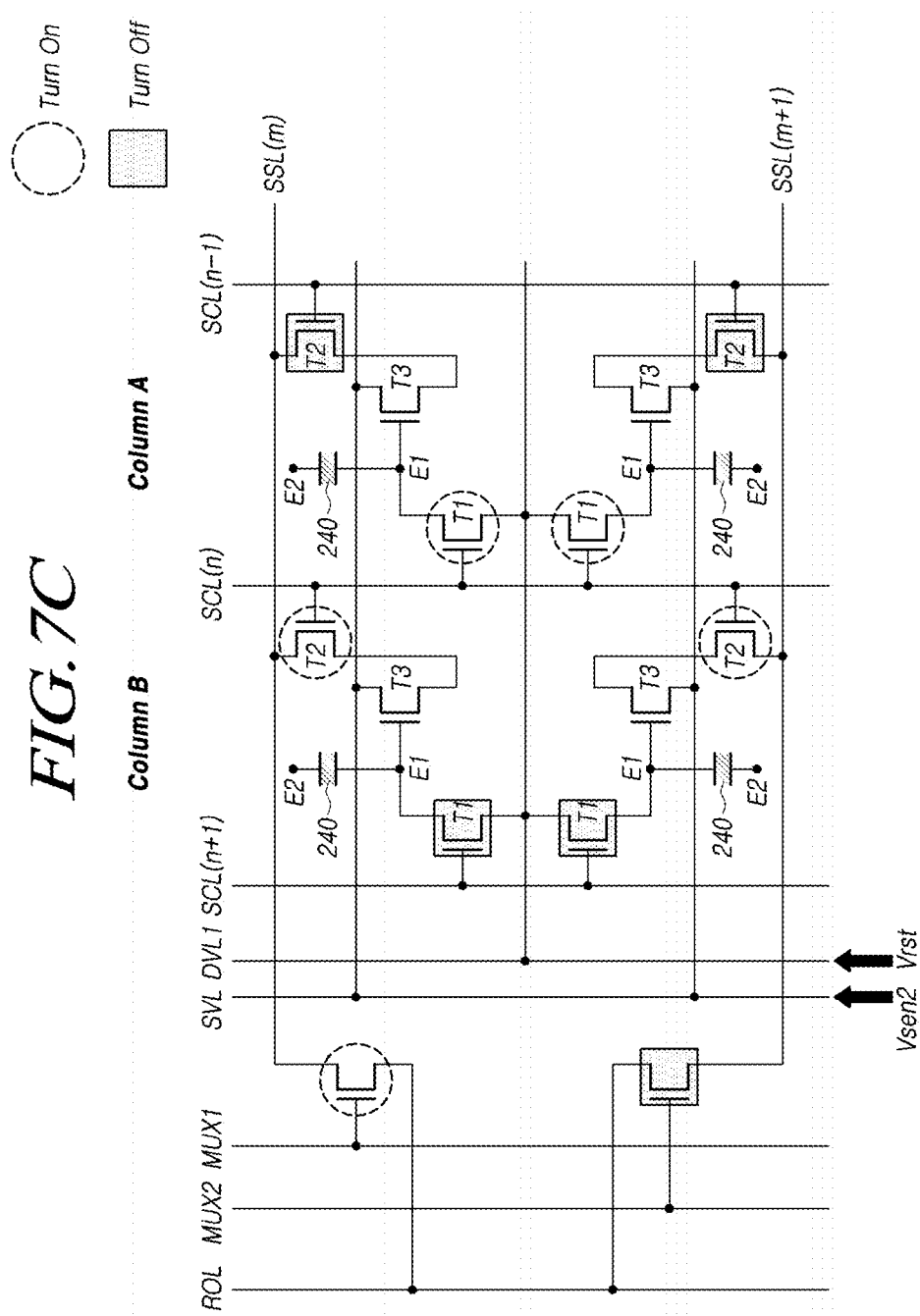
Figure 7D:
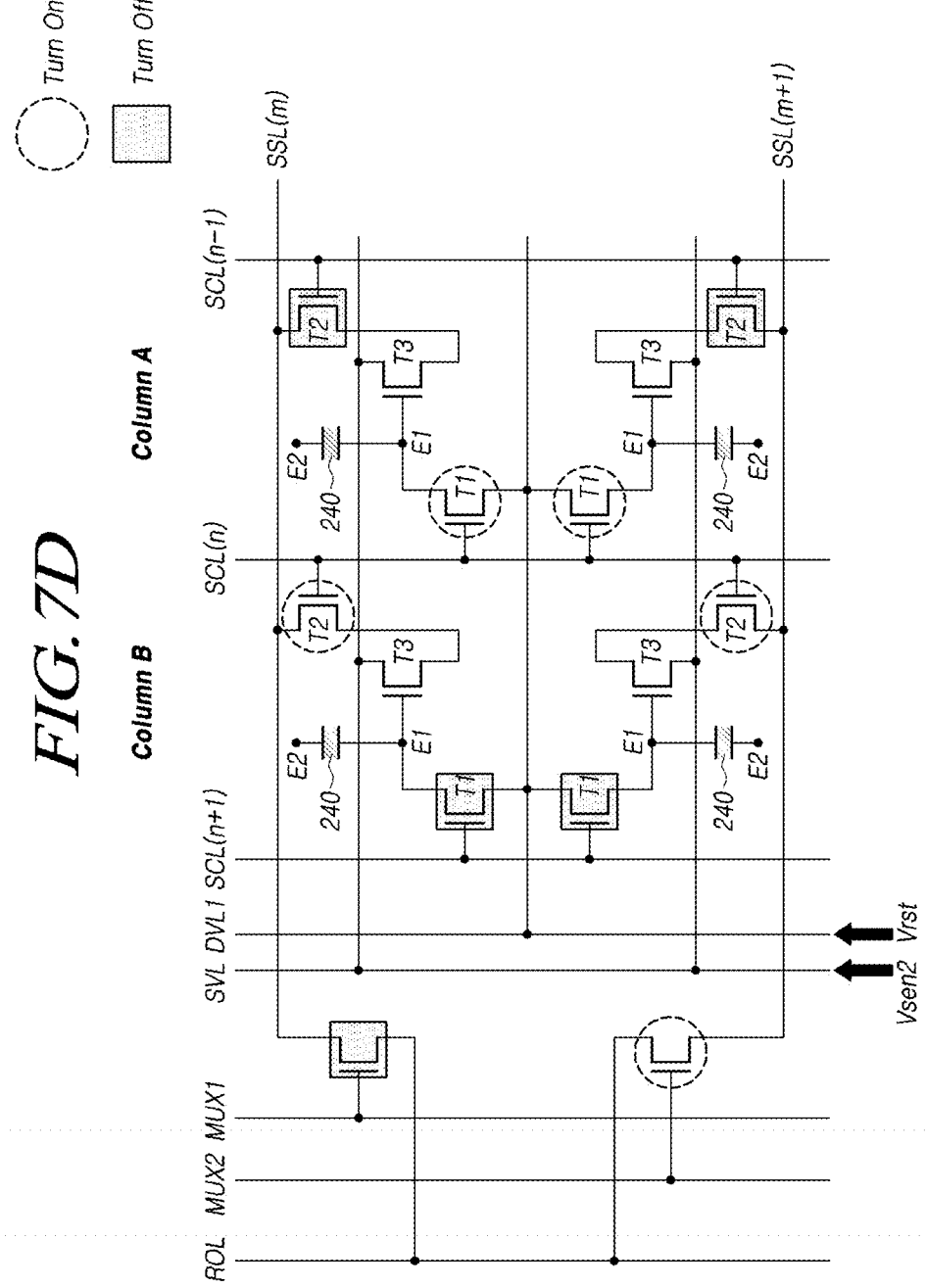

Referring to FIGS. 4, 7C and 7D, after finishing a detection of the sensing signal from the sensing pixels of the column A, the scan signal of the turn off level may be supplied to (n−1)th scan line SCL(n−1). Thus, the second thin film transistor T2 connected to (n−1)th scan line SCL (n−1) may become in the turn off state.

And the scan signal of the turn on level may be supplied to nth scan line SCL(n). Thus, the first thin film transistor T1 and the second thin film transistor T2 connected to nth scan line SCL(n) may become in the turn on state.

For example, the first thin film transistor T1 disposed in the sensing pixels of the column A and the second thin film transistor T2 disposed in the sensing pixels of the column B may become in the turn on state. And as (n+1)th scan line SCL(n+1) is a state that the scan signal of the turn off level is supplied, the first thin film transistor T1 disposed in the sensing pixels of the column B may maintain the turn off state.

Since the second thin film transistor disposed in the sensing pixels of the column B become in the turn on state, the sensing signal may be detected from the sensing pixels of the column B.

Referring to FIG. 7C, the first multiplexer MUX1 may be turned on and the sensing signal stored in the sensing pixels of the column B connected to mth sensing line SSL(m) may be detected through the readout line ROL. And referring to FIG. 7D, the second multiplexer MUX2 may be turned on and the sensing signal stored in the sensing pixels of the column B connected to (m+1)th sensing line SSL(m+1) may be detected through the readout line ROL.

At this, as the first thin film transistor T1 disposed in the sensing pixels of the column A is in the turn on state, the reset voltage Vrst being supplied through the first driving voltage line DVL1 may be supplied to the first electrode E1 disposed in the sensing pixels of the column A.

Thus, after finishing the detection of the signal stored in the first electrode E1 of the sensing pixels of the column A, the first electrode E1 of the sensing pixels of the column A may be reset in a period detecting the sensing signal from the sensing pixels of the column B.

In this way, according to various embodiments of the disclosure, as transmitting the ultrasonic wave by supplying the alternating current voltage to the second electrode E2 disposed on the plurality of sensing pixels commonly, the ultrasonic wave may be transmitted in the plurality of sensing pixels simultaneously. Thus, a duration and a number of the ultrasonic wave transmitting may be reduced, the deterioration of the thin film transistor due to applying the high voltage may be prevented.

And storing the signal by floating the first electrode E1 according to the timing receiving the reflected signal, and then sensing sequentially, an accuracy and a sensitivity of the sensing may be maintained while reducing a duration and a number of the ultrasonic wave transmitting.

Furthermore, in some cases, for storing the received signal, only the first electrode E1 may become in the floating state, and the second electrode E2 may maintain a constant voltage state after transmitting the ultrasonic wave.

FIG. 9 is a view illustrating another example of a supplied signal and a timing that the signal is supplied when driving the ultrasonic sensor 200 according to various embodiments of the disclosure.

Referring to FIG. 9, the scan signal of the turn on level may be supplied to the plurality of scan lines SCL in the first period P1. And the first driving voltage Vdrv1, being the constant voltage, may be supplied through the first driving voltage line DVL1, the first driving voltage Vdrv1 may be applied to the first electrode E1.

The second driving voltage Vdrv2, being the alternating current voltage, may be supplied to the second electrode E2 in at least a part of a period that the first driving voltage Vdrv1 is supplied to the first electrode E1. Thus, the piezoelectric material 240 disposed between the first electrode E1 and the second electrode E2 may vibrate and the ultrasonic wave may be transmitted.

After the ultrasonic wave is transmitted, a supply of the second driving voltage Vdrv2 to the second electrode E2 may be stopped in the second period P2. And the constant voltage may be supplied to the second electrode E2, for example, the second electrode E2 may be a state that the ground voltage is applied.

In a state that the ground voltage is applied to the second electrode E2, the scan signal of the turn off level may be supplied to the plurality of scan lines SCL according to the timing that the reflected signal is received.

Thus, the first electrode E1 may become in the floating state, and the received signal may be stored in the first electrode E1.

The second electrode E2 may be maintained as a state that the constant voltage is applied in the third period P3, the sensing voltage Vsen being supplied to the sensing voltage line SVL may be changed from the first sensing voltage Vsen1 to the second sensing voltage Vsen2.

And the plurality of scan lines SCL may be driven sequentially, and the sensing signal may be detected from the plurality of sensing pixels sequentially.

Furthermore, as supplying the reset voltage Vrst different from the first driving voltage Vdrv1 to the first driving voltage line DVL1 in the third period P3, the first electrode E1 of the sensing pixel which the sensing signal is detected may be reset by the reset voltage Vrst.

In this way, by maintaining a state that the ground voltage is applied to the second electrode E2 after transmitting the ultrasonic wave, the second electrode E2 may not be changed to the floating state between the ultrasonic wave transmitting period and the readout period.

According to various embodiments of the disclosure, as driving the plurality of sensing pixels simultaneously to transmit the ultrasonic wave, a duration and a number of the ultrasonic wave transmitting may be reduced. Furthermore, by supplying the high voltage for transmitting the ultrasonic wave to the second electrode E2 disposed on the plurality of sensing pixels commonly, the deterioration of the thin film transistor due to applying the high voltage may be prevented.

And as floating the first electrode E1 according to the timing that the signal is reflected, storing the received signal in the first electrode E1 disposed in each sensing pixel, and performing the sensing sequentially, so a sensitivity and an accuracy of the sensing may be maintained while reducing a duration of the ultrasonic wave transmitting.

Furthermore, as initializing the first electrode E1 of the sensing pixel which the detection of the sensing signal is finished by the reset voltage Vrst, an accuracy of the sensing performed subsequently may be improved without increasing the sensing period.

It will be apparent to those skilled in the art that various modifications and variations can be made in the ultrasonic sensor and the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. An ultrasonic sensor, comprising:
   a pixel array which a plurality of scan lines, a plurality of sensing lines and a plurality of sensing pixels are disposed;
   a plurality of first electrodes disposed in each of the plurality of sensing pixels;
   a piezoelectric material disposed on the first electrode; and
   a second electrode disposed on the piezoelectric material,
   wherein a first driving voltage is simultaneously supplied to the plurality of first electrodes in a first period, and a second driving voltage is supplied to the second electrode in the first period,
   in a state that a supply of the second driving voltage to the second electrode is stopped in a second period, a supply of the first driving voltage to the first electrode is stopped at a preset timing in the second period, and
   a sensing signal is detected from the sensing pixel in a third period.

2. The ultrasonic sensor of claim 1, wherein a scan signal of a level to turn on a thin film transistor electrically connected to each of the plurality of scan lines is simultaneously supplied to the plurality of the scan lines in the first period.

3. The ultrasonic sensor of claim 1, wherein in a state that a scan signal of a level to turn on a thin film transistor electrically connected to each of the plurality of scan lines is supplied to the plurality of scan lines in the second period, a scan signal of a level to turn off the thin film transistor electrically connected to each of the plurality of scan lines is simultaneously supplied to the plurality of scan lines.

4. The ultrasonic sensor of claim 1, wherein a scan signal of a level to turn on a thin film transistor electrically connected to each of the plurality of scan lines is sequentially supplied to the plurality of scan lines in the third period.

5. The ultrasonic sensor of claim 1, wherein the first driving voltage is a constant voltage, and the second driving voltage is an alternating current voltage.

6. The ultrasonic sensor of claim 1, wherein the first driving voltage is a voltage of a level to turn on a thin film transistor controlled by a voltage level of the first electrode.

7. The ultrasonic sensor of claim 1, wherein a reset voltage is supplied to the first electrode disposed in the sensing pixel in at least a part of the third period, and an absolute value of a level of the reset voltage is smaller than an absolute value of a level of the first driving voltage.

8. The ultrasonic sensor of claim 7, wherein the reset voltage is supplied after the sensing signal is detected from the sensing pixel.

9. The ultrasonic sensor of claim 1, wherein a constant voltage is supplied to the second electrode in the third period.

10. The ultrasonic sensor of claim 1, wherein each of the plurality of sensing pixels comprises:
    a first thin film transistor controlled by a scan signal supplied to the scan line, and electrically connected between a first driving voltage line supplying the first driving voltage and the first electrode;
    a second thin film transistor controlled by the scan signal supplied to the scan line, and electrically connected to the sensing line; and
    a third thin film transistor controlled by a voltage level of the first electrode, and electrically connected between a sensing voltage line supplying a sensing voltage and the second thin film transistor.

11. The ultrasonic sensor of claim 10, wherein a first sensing voltage is supplied to the sensing voltage line in the first period and at least a part of the second period, and a second sensing voltage is supplied to the sensing voltage line in the third period, and
    a level of the first sensing voltage is lower than a level of the second sensing voltage.

12. The ultrasonic sensor of claim 10, wherein a level of the first driving voltage supplied to the first electrode in the first period is included in a saturation region in a relation graph between the sensing voltage and an output current of the third thin film transistor.

13. The ultrasonic sensor of claim 10, wherein the first thin film transistor disposed in a sensing pixel of nth line and the second thin film transistor disposed in a sensing pixel of (n+1)th line are electrically connected to same scan line.

14. A display device, comprising:
    a display panel; and an ultrasonic sensor according to claim 1 embedded in the display panel or disposed on at least one surface of the display panel.

15. An ultrasonic sensor, comprising:
a pixel array which a plurality of scan lines, a plurality of sensing lines and a plurality of sensing pixels are disposed;
a plurality of first electrodes disposed in each of the plurality of sensing pixels;
a piezoelectric material disposed on the first electrode; and
a second electrode disposed on the piezoelectric material,
wherein a second driving voltage is supplied to the second electrode in a part of a period that a first driving voltage is simultaneously supplied to the plurality of first electrode, and then a sensing signal is detected from the plurality of sensing pixels, and
a period that the plurality of first electrodes are in a floating state is present between a period that the second driving voltage is supplied and a period that the sensing signal is detected.

16. The ultrasonic sensor of claim 15, wherein a period that the second electrode is in a floating state is present in at least a part of a period that the plurality of first electrodes are in a floating state.

17. The ultrasonic sensor of claim 15, wherein a constant voltage is supplied to the second electrode in a period that the plurality of first electrodes are in a floating state.

18. The ultrasonic sensor of claim 15, wherein a scan signal of a level to turn on a thin film transistor electrically connected to each of the plurality of scan lines is simultaneously supplied to the plurality of scan lines in a period that the first driving voltage is supplied, and
a scan signal of a level to turn on the thin film transistor electrically connected to each of the plurality of scan lines is sequentially supplied to the plurality of scan lines in a period that the sensing signal is detected.

19. The ultrasonic sensor of claim 15, wherein a reset voltage having a different level from the first driving voltage is supplied to the first electrode after detecting the sensing signal from the sensing pixel.

* * * * *